United States Patent [19]
Easley

[11] 3,890,000
[45] June 17, 1975

[54] ADJUSTABLE LUMBAR AREA SUPPORT FOR VEHICLE SEATBACKS

[75] Inventor: Ronald V. Easley, Toledo, Ohio

[73] Assignee: Dura Corporation, Southfield, Mich.

[22] Filed: Dec. 3, 1973

[21] Appl. No.: 421,241

[52] U.S. Cl. ............................................. 297/284
[51] Int. Cl. .............................................. A47c 3/00
[58] Field of Search .................................... 297/284

[56] References Cited
UNITED STATES PATENTS
2,991,124 7/1961 Scwarz .............................. 297/284
3,807,794 4/1974 Beyer ................................. 297/284

Primary Examiner—James C. Mitchell
Attorney, Agent, or Firm—Hill, Gross, Simpson, Van Santen, Steadman, Chiara & Simpson

[57] ABSTRACT

A horizontally elongated lumbar support member is carried by an adjustably movable mount in position at the lumbar area of a vehicle seatback in thrusting relation to and behind a flexible backrest of the seatback, and by selectively adjustably moving the mount the position of the support member forwardly and rearwardly relative to the backrest is effected. An electrically controlled motor driven adjusting screw rod operates a crank arm on a rock shaft carrying the lumbar support member in the form of a contoured plate. The device is constructed and arranged as a self-contained unit to be mounted on the frame within the seatback.

12 Claims, 7 Drawing Figures

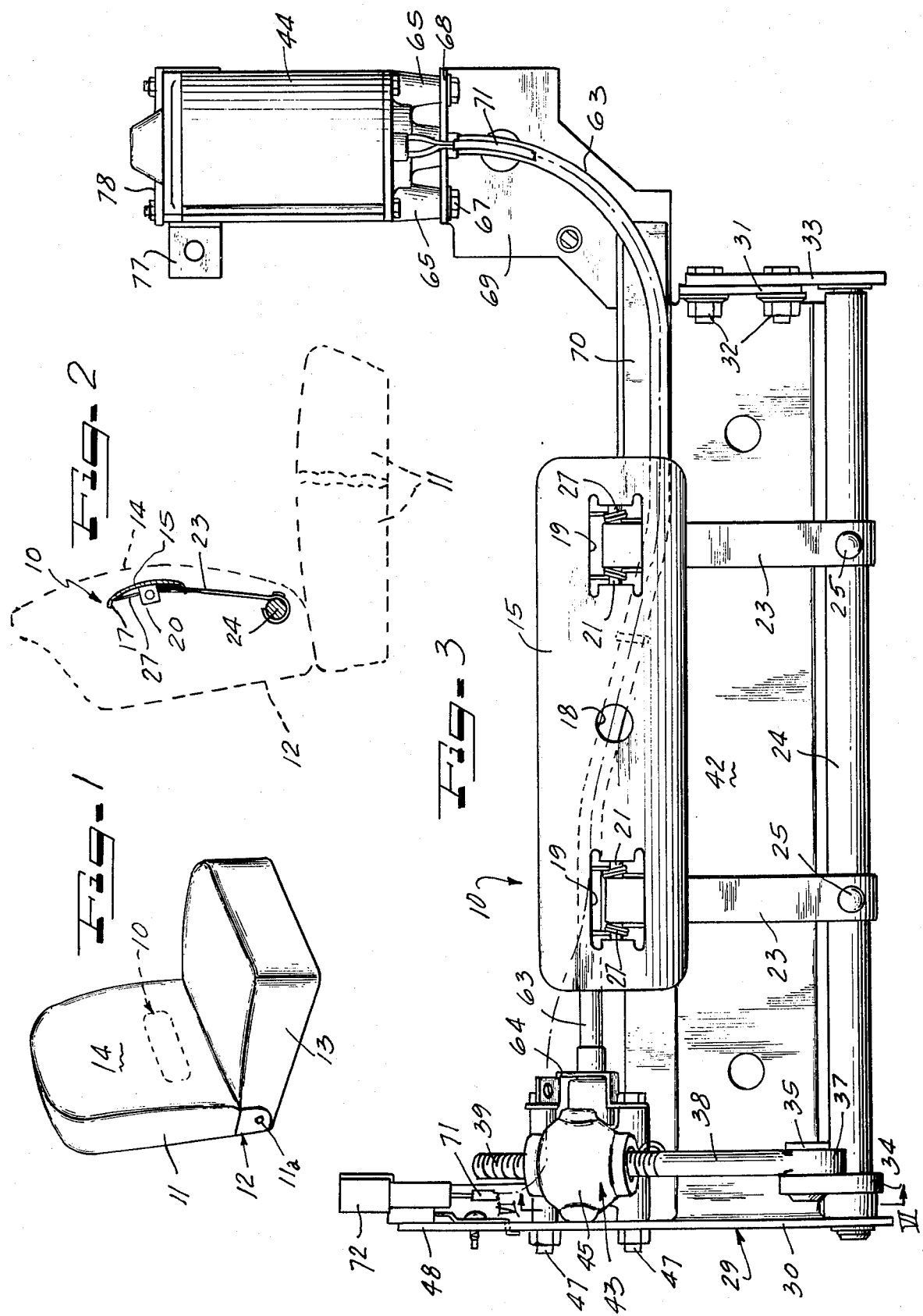

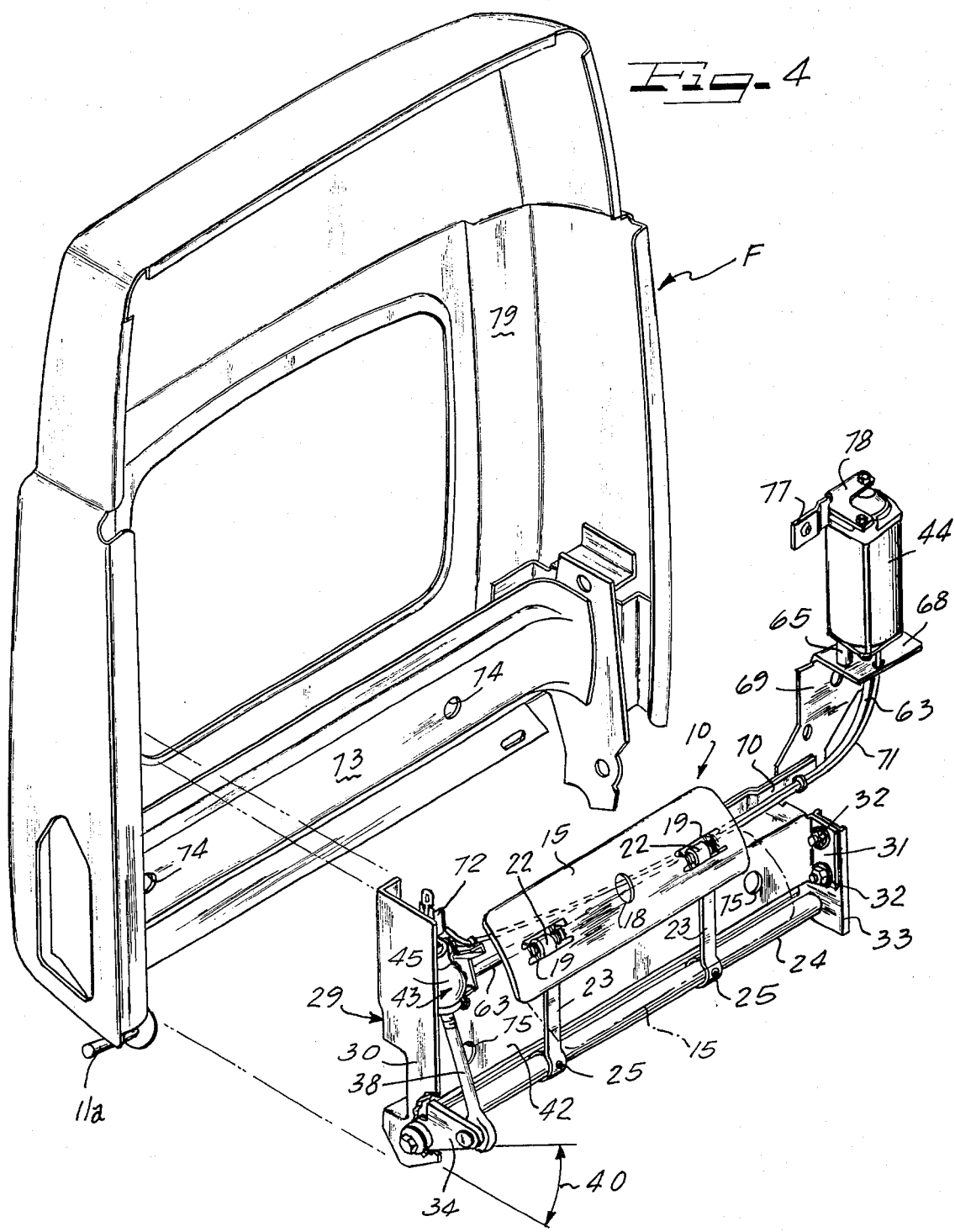

PATENTED JUN 17 1975 3,890,000
SHEET 3
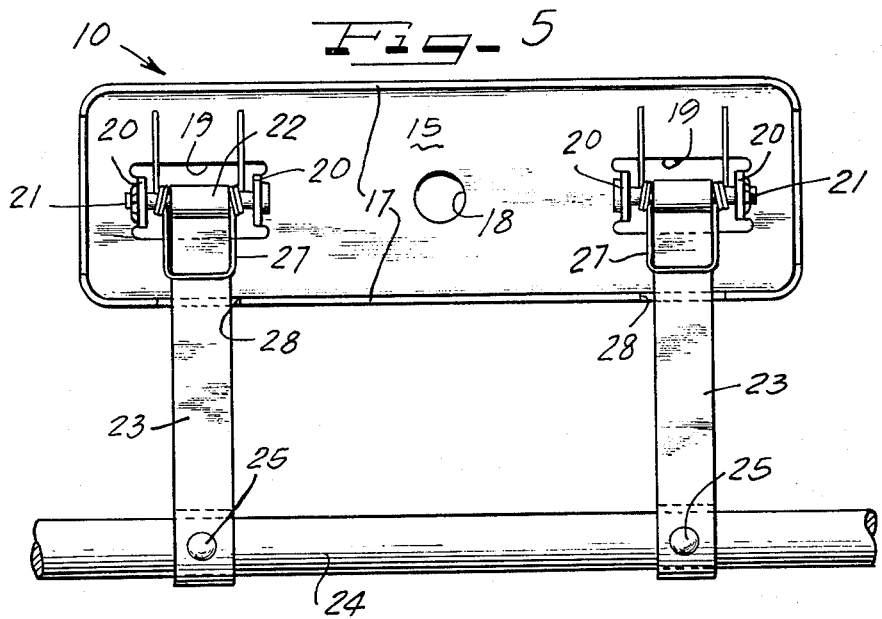
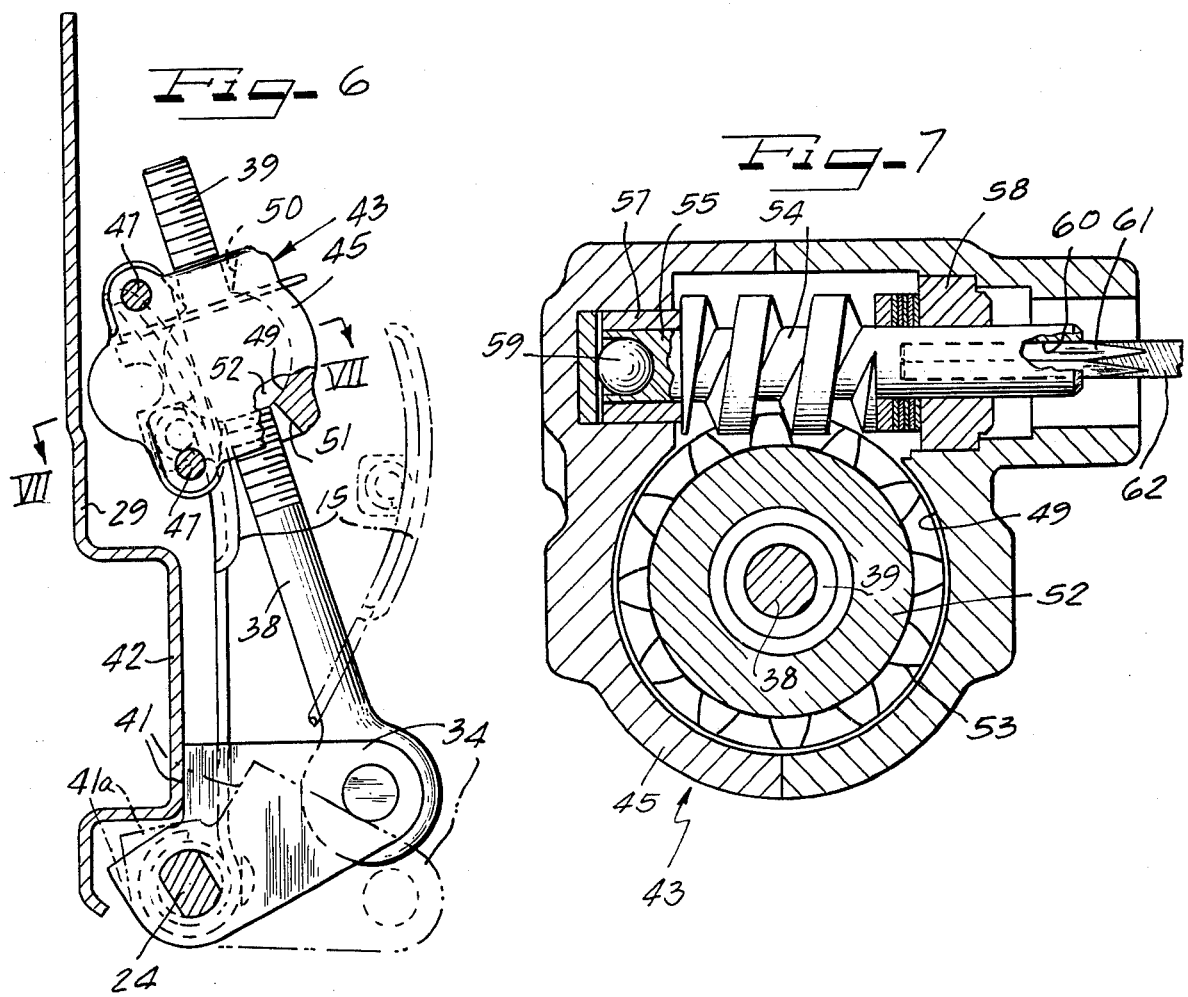

ADJUSTABLE LUMBAR AREA SUPPORT FOR VEHICLE SEATBACKS

This invention relates to vehicle seatbacks, and is more particularly concerned with a new and improved adjustable lumbar area support for such seatbacks.

One of the problems with standardized vehicle seats, and more particularly automotive vehicle seats is that they do not fit every driver, especially in the supportive contour of the backrest of the seat, and more particularly in the lumbar area, i.e., where the small of the back engages the backrest. Lack of proper lumbar area support can be a major factor in bringing on driving fatigue in a person driving a motor vehicle.

It is, accordingly, an important object of the present invention to provide a new and improved adjustable lumber area support for vehicle seatbacks which will overcome the aforementioned problem.

Another object of the invention is to provide a new and improved adjustable lumbar area support device which can be readily installed in a vehicle seatback in proper position to cooperate with a flexible backrest of the seatback.

A further object of the invention is to provide a new and improved adjustable lumbar area support for vehicle seatbacks which can be economically produced as a self-contained unit for installation in a vehicle seatback.

A still further object of the invention is to provide a new and improved adjustable lumbar area support for vehicle seatbacks which is simple in construction, inexpensive to produce, rugged and durable and efficient to use.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 1 is an isometric view of a representative form of vehicle seat with which the present invention is useful;

FIG. 2 is a schematic side elevational view showing how the lumbar area support cooperates with the backrest of the seat in one adjusted position of the device;

FIG. 3 is a front elevational view of a device according to the present invention constructed as a self-contained unit;

FIG. 4 is an exploded isometric view showing a vehicle seat frame and the device of FIG. 3 to illustrate how the device is adapted to be mounted in the frame;

FIG. 5 is a fragmentary rear elevational view of the lumbar support member;

FIG. 6 is a vertical sectional elevational view taken substantially along the lines VI—VI of FIG. 3; and FIG. 7 is an enlarged fragmentary sectional view taken substantially along the lines VII—VII of FIG. 6.

On reference to FIGS. 1 and 2, a lumbar area support 10 is constructed and arranged to be mounted within a seatback 11 of a vehicle seat 12 having a seat portion 13 to which the seatback 11 may be pivotally connected as at 11a, although the support 10 may be mounted in that type of vehicle seat where the seatback is fixedly mounted relative to the seat portion of the seat assembly. In any event, the lumbar area support 10 is located in position at the lumbar area of the seatback in thrusting relation to and behind a flexible backrest 14 of the seatback 11, whereby the backrest can be adjusted in the lumbar area to accomodate the support needs of any particular user of the seat 12 by greater or less forward projection of the backrest 14 in the lumbar area, and the support 10 maintaining the preferred, user comfort contour.

In a preferred form, the lumbar support 10 comprises a plate member 15 (FIGS. 2, 3, 5 and 6) which is horizontally elongated, of outwardly curved form across its narrowest dimension and the edges of the plate finished as by rounding off to avoid presenting any rough or cutting edges to the backrest 14. For reinforcement the edges are provided with rearwardly turned reinforcing flange structure 17. A central breather hole 18 and two laterally spaced apertures 19 in the plate contribute to user comfort. Material struck from the apertures 19 provides rearwardly projecting pairs of parallel attachment ears 20 between and through which extend connecting pins 21 received through hinge curls 22 on the upper end portions of upwardly extending spring arms 23 the lower end portions of which are curled about a horizontal supporting rock shaft 24 and secured fixedly thereto as by means of rivets 25. Pivotal adjustment of the plate 15 about the common axis of the pins 21 is controlled by respective hairpin type torsion springs 27 engaged about the pins 21 and having opposite end portions engaging respectively behind the arms 23 and behind the plate 15 above the apertures 19, there being respective clearance gap slots 28 in the reinforcing flange 17 along the lower edge of the plate 15 to clear the arms 23.

Means are provided for supporting the adjustably movable lumbar support member carrying mount provided by the arms 23 and the rock shaft 24 as a self-contained unit for factory assembly so as to be readily installed in the seatback 11 on a production assembly line. For this purpose there is provided a supporting frame 29 desirably in the form of a horizontally elongated heavy gauge sheet metal plate. At one end the plate 29 has a vertically extending forwardly directed support flange 30 providing bearing for one journal end of the shaft 24. At its opposite end, the plate 29 has a vertically extending forwardly projecting integral supporting flange 31 which is shorter than the flange 30 and carries attached thereto as by means of bolts 32 a supporting bracket 33 providing a bearing for the adjacent journal end of the shaft 24.

Means for selectively adjustably moving the mount comprising the arms 23 and the shaft 24 to adjust the position of the lumbar support member 15 forwardly and rearwardly relative to the backrest 14, comprise a forwardly projecting lever arm 34 fixedly keyed to the shaft 24 adjacent to the flange 30 and having attached in articulated pivotal but non-rotational relation thereto as by means of a bearing pin or rivet 35 a lower journal eye end 37 of an actuator 38 which is in the form of a screw rod link member which extends generally upwardly and has its upper end portion provided with helical screw threads 39. By reciprocal push-pull movements of the actuator rod 38, the lever arm 34 is correspondingly actuated to rock the shaft 24 and thereby the lumbar support assembly 10, as indicated by the directional arrow 40 in FIG.. 4 and the full line and dash line positions in FIG. 6. The rearwardmost position of the support member 15 is defined by engagement of a stop shoulder 41 on the lever arm 34 with a forwardly projecting horizontally extending reinforcing channel bar formation 42 in the support frame plate 29. Limit on forward projection of the member 15 is defined by a stop shoulder 41a on the lever arm 34 engageable with the underside of the bar formation 42.

Means for driving the actuator rod 38 comprise a power transmission unit 43 coupled in slave relation to an electrical drive motor 44 (FIGS. 3 and 4). For this purpose, the power transmission 43 comprises a housing 45 which is secured as by means of bolts 47 to an upward extension portion 48 of the flange 30. Within the housing 45 is provided a generally spherical chamber 49 (FIGS. 6 and 7) through which the threaded end portion of the rod 38 extends, there being coaxial flared upper and lower openings 50 and 51 into the chamber 49 and providing clearance for oscillation of the rod 38 in operation. Mounted within the chamber 49 is a ball unit 52 threadedly engaged about the threaded end portion 39 of the rod 38 and having worm gear teeth 53 on its perimeter meshing with a worm gear 54 having a shaft 55 one end portion of which provides a journal rotatable in a bearing 57 and the opposite end portion of which provides a journal extending rotatably through a bearing 58. At the end of the shaft 55 which is journaled in the bearing 57, a thrust ball bearing 59 is provided. At its opposite end, the shaft 55 has a socket 60 of angular cross section in which is received a complementary angular cross section connecting terminal 61 of a flexible drive shaft 62 by which the worm is coupled drivingly with the motor 44. Enclosing the flexible shaft 62 protectively is a guard sheath tube 63 secured to the housing 45 as by means of a bracket 64. Mounting of the motor 44 is desirably on a vertical axis with its drive shaft connected corotatably at its lower end with the flexible shaft 62 and the motor supported as by means of a pair of depending housing posts 65 thereon secured as by means of screws 67 to a forwardly projecting shelf flange 68 (FIGS. 3 and 4) on an upstanding bracket 69 secured as by means of welding to a motor supporting adjacent upper flange portion 70 of the support frame plate 29. Attachment of the adjacent end of the flexible shaft sheath tube 63 to the underside of the flange 68 is effected in any suitable manner, there being a suitable aperture (not shown) for coupling of the flexible shaft with the motor shaft.

For the present purpose, of course, the motor 44 must be of the reversible type and of relatively low RPM so that operation of the device may be effected smoothly and free from jerky movement. Control of the motor 44 may be effected in any suitable manner, such as through an electrical cable 71 leading from a terminal block 72 which may be mounted on the upper portion of the flange extension 48 and to which are connected suitable leads from a power source such as a battery (not shown) and a double acting control switch (not shown) mounted at a suitable position in the associated vehicle or in association with the seat 12 to be manually operated as desired.

Within the seatback 11, the lumbar area support 10 as a self-contained unit is adapted to be mounted in and on the frame of the seatback identified as F (FIG. 4). Such frame may include a horizontal bar 73 having horizontally spaced manufacturing holes 74 and on which bar the channel formation 42 of the frame plate 29 is engaged with manufacturing holes 75 therein which may match the holes 74. Any suitable securing screws or bolts (not shown) are engaged in securing relation between the frame 29 and the frame F. In addition an attachment ear 77 on an attachment bracket 78 on the upper portion of the motor 44 may be secured to a surface such as a vertical flange portion 79 of the seat frame F. With the lumbar area support unit 10 thus mounted within the seat frame, the plate member 15 will be in the proper position behind the lumbar area of the backrest 14 of the seatback to thrust into the backrest which may be of any preferred construction such as fabric covered foam rubber and wire reinforcing backing. Forward movement of the support plate 15 will cause the backrest 14 to deform outwardly in the area of the small of the back to give support to the lumbar region of the driver of the vehicle and if a similar lumbar suupport has been provided in the passenger seatback selectively for the passenger. The spring arms 23 provide desirable yieldable pressure for the plate 15, and the torsion springs 27 provide for desirable contour adjustability of the plate in response to back pressure thereagainst. The worm drive of the transmission actuator 43 effectively holds the actuator rod 38 in any incrementally longitudinally adjusted position thereof and thus the angular position of the rock shaft 24 and the attitude of the support panel 15 relative to the backrest 14. It should also be observed that by virtue of the push-pull actuator rod 38 being non-rotatable and slanting upwardly and rearwardly toward the frame 29 and provided with only a limited upper portion threaded area 39, and the actuating ball nut 52 enclosed within a fixed housing, there is freedom from interference from fabric or padding in the seatback 14 with operation of the motion transmission mechanism, and more particularly, the actuator rod 38.

It will be understood that variations and modifications may be effected without departing from the spirit and scope of the novel concepts of this invention.

I claim as my invention:

1. In an adjustable lumbar area support for vehicle seatbacks including a frame carrying a rock shaft and arm means connecting the shaft to a horizontally elongated lumbar support member in position at the lumbar area of a vehicle seatback in thrusting relation to and behind a flexible backrest of the seatback, the improvement comprising:

a lever arm corotatably fixed on said rock shaft;
an actuating rod pivotally but non-rotatably connected to said lever arm and projecting generally away from said backrest; and
means for selectively effecting push-pull reciprocal movement of said actuating rod, including a worm gear nut mounted in a fixed operating position on said frame and engaging threadedly with a portion of said actuating rod, there being a worm gear meshing with said nut and drivingly coupled with an electrical drive motor mounted on said frame.

2. A lumbar area support according to claim 1, wherein said support member comprises a plate having rearwardly extending attachment ears pivotally connected to said arm means, and biasing spring means acting between the arm means and the plate for normally maintaining the plate in one attitude relative to the arms but permitting pivotal adjustment of the plate responsive to pressure applied through said backrest, said plate having ventilation openings therethrough communicating with the backrest pressing thereagainst.

3. A lumbar area support according to claim 1, wherein said lever arm has a stop shoulder engageable with said frame to limit rotation of said rock shaft for moving said support member rearwardly relative to said backrest.

4. A lumbar area support according to claim 1, wherein said lever arm has a stop shoulder engageable with said frame to limit rotation of said rock shaft for moving said support member forwadly relative to said backrest.

5. A lumber area support according to claim 1, wherein said lever arm has respective shoulders for limiting rocking movements of said rock shaft both for moving said support member forwardly and rearwardly.

6. A lumber area support according to claim 1, wherein said worm gear nut is of generally ball shape and said housing has a complementary generally spherical chamber within which the nut is supported, said actuating rod extending through said nut and through opposite openings in said housing which are flared at said openings to provide clearance for oscillation of the rod in following movements of the lever arm during reciprocations of the rod by action of said nut.

7. An adjustable lumber area support device for vehicle seatbacks, the support being constructed as a self-contained unit to be mounted in and on a vehicle seatback frame, and comprising a unit frame having means for mounting it on the seatback frame, a rock shaft rockably supported by said unit frame and carrying in fixed relation thereon a horizontally elongated lumbar support member adapted to be positioned at the lumbar area of a vehicle seatback in thrusting relation to and behind a flexible backrest of the seatback, and comprising:

a generally radially extending lever arm fixed on said rock shaft;

a reciprocable non-rotary actuator rod linked to said lever arm for adjustably rocking said shaft to move said support member toward and away from the backrest;

and actuating mechanism carried by said unit frame and engaged with said rod and operable to shift the rod adjustably selectively reciprocably for effecting rocking of said shaft through said lever arm and thereby movement of said support member, said actuating mechanism being drivingly coupled with an electrical drive motor mounted on said unit frame.

8. A lumbar area support according to claim 7, wherein said support member comprises a plate having rearwardly extending attachment ears pivotally connected to said arm means, and biasing spring means acting between the arm means and the plate for normally maintaining the plate in one attitude relative to the arms but permitting pivotal adjustment of the plate responsive to pressure applied through said backrest, said plate having ventilation openings therethrough communicating with the backrest pressing thereagainst.

9. A lumbar area support according to claim 7, wherein said lever arm has a stop shoulder engageable with said unit frame to limit rotation of said rock shaft for moving said support member rearwardly relative to said backrest.

10. A lumbar area support according to claim 7, wherein said lever arm has a stop shoulder engageable with said unit frame to limit rotation of said rock shaft for moving said support member forwardly relative to said backrest.

11. A lumbar area support according to claim 7, wherein said lever arm has respective shoulders for limiting rocking movements of said rock shaft both for moving said support member forwardly and rearwardly.

12. A lumbar area support according to claim 7, said actuating mechanism comprising a housing fixed on said unit frame and having therein a generally spherical chamber within which a generally ball-shaped nut is supported, said housing having opposite outwardly flared openings aligned with a threaded opening through said nut, said rod extending through said openings and said nut and having a threaded portion engaged with the threads of the nut, and means for driving said nut selectively in respectively opposite rotary directions for effecting reciprocating movements of the rod.

* * * * *